Patented Mar. 25, 1930

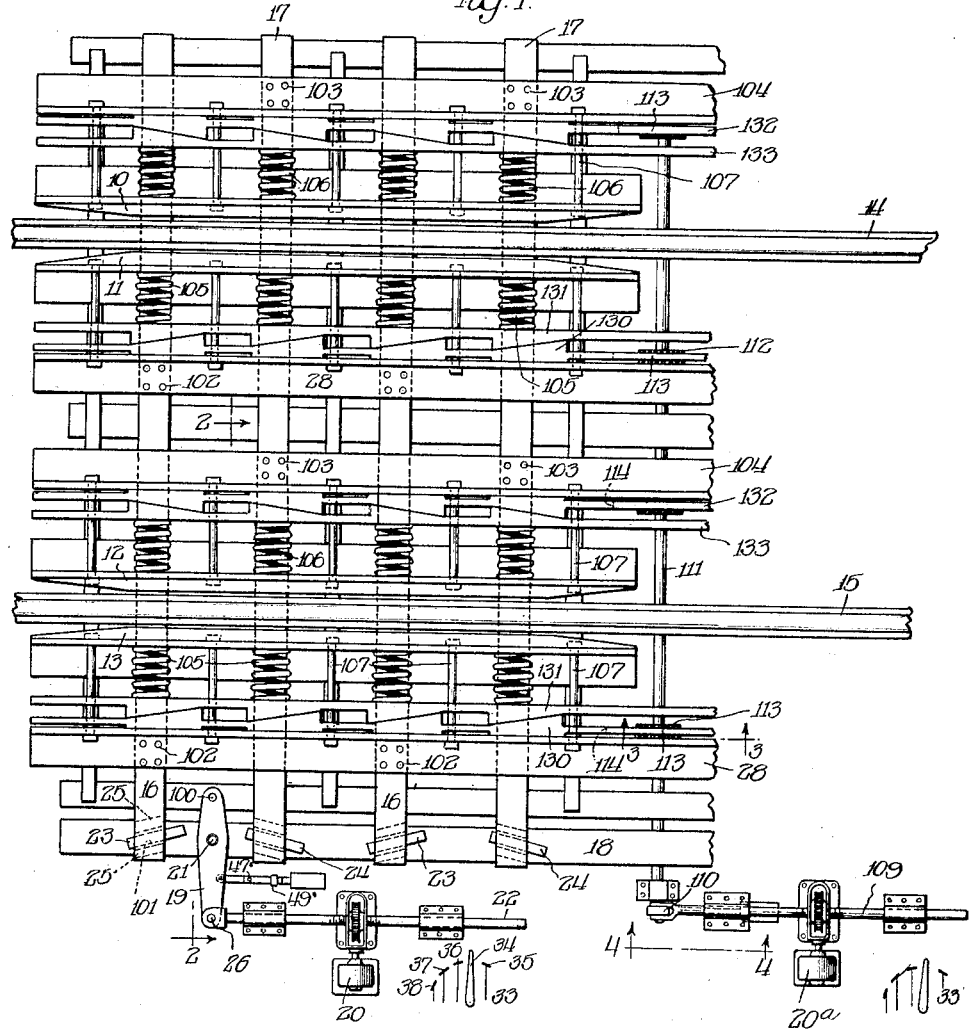

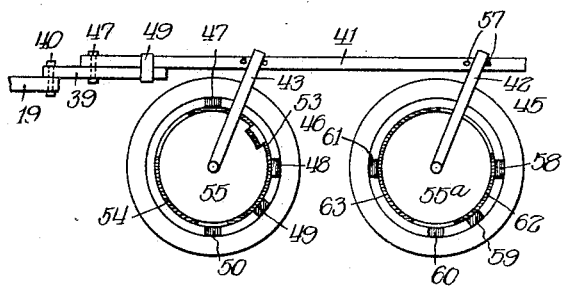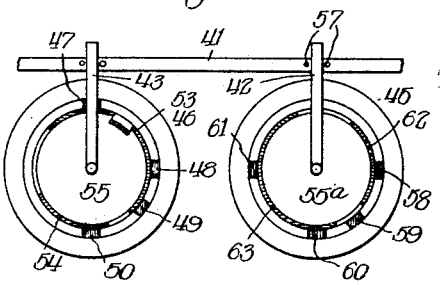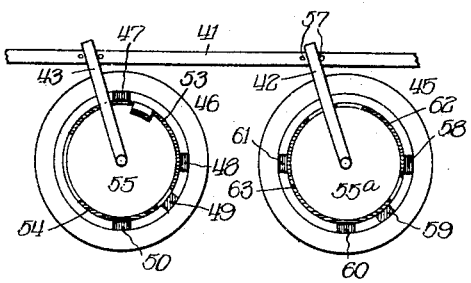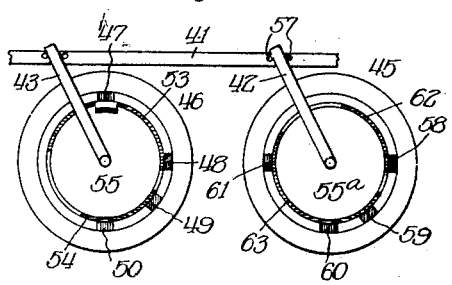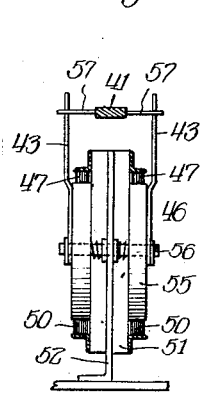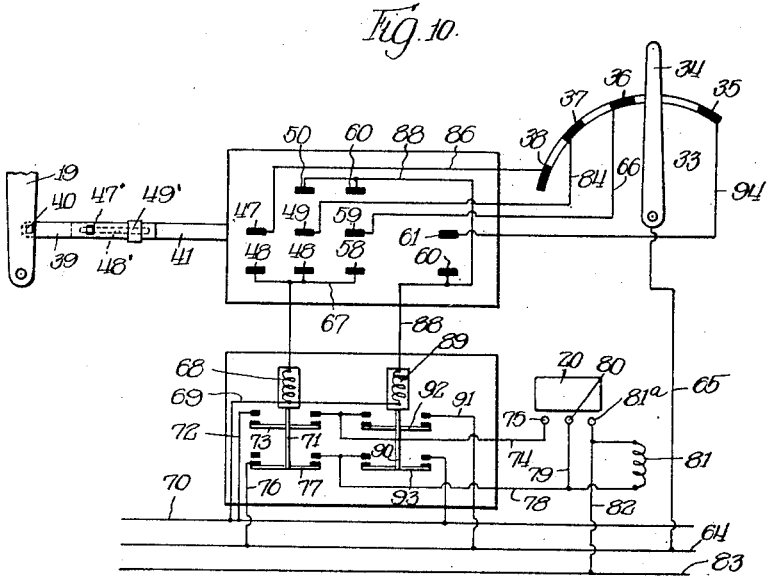

1,751,995

UNITED STATES PATENT OFFICE

GEORGE HANNAUER, OF CALUMET CITY, ILLINOIS, AND EDGAR M. WILCOX, OF HAMMOND, INDIANA, ASSIGNORS TO HANNAUER CAR RETARDER COMPANY, OF CHICAGO, ILLINOIS, A CORPORATION OF ILLINOIS

TRACK-BRAKE ARRANGEMENT AND CONTROL MEANS THEREFOR

Application filed May 15, 1925. Serial No. 30,434.

This invention relates to a track brake arrangement and control means therefor and is an improvement on the arrangement disclosed in our Patent No. 1,638,631, granted August 9, 1927, for track brake mechanism and control means therefor.

One object of the invention is to provide simple, durable, reliable and efficient track brake mechanism and control means therefor whereby the brakes are given definite controlled step-by-step graduated movements and positions for brake applying and releasing purposes and in a manner whereby a wide range of braking pressures may be selectively exerted.

Another object is to provide track brake apparatus and control means therefor whereby normal braking operations are controlled through one unit and emergency braking operations are controlled through another or auxiliary unit.

Another object is to provide track brake apparatus and control means therefor as above indicated which are adapted to meet the requirements under service conditions.

These and other objects are accomplished by means of the arrangement disclosed on the accompanying sheets of drawings, in which Fig. 1 is a fragmentary top plan view of track brake mechanism and control means therefor embodying our invention;

Fig. 2 is fragmentary cross-sectional view of the same taken in the plane of line 2—2 of Fig. 1;

Fig. 3 is a detail view taken in the plane of line 3—3 of Fig. 1;

Fig. 4 is a fragmentary end view of a detail taken in the plane of line 4—4 of Fig. 1;

Figs. 5, 6, 7 and 8 are side elevations of automatically actuated control members responsive to movements of the brakes, somewhat diagrammatic and which cooperate to control circuit connections, the various figures showing different positions of said control parts;

Fig. 9 is an end view of one of the control members as shown in Figs. 5, 6, 7 and 8, and Fig. 10 is a diagrammatic view showing one of the two duplicate electrical control systems for controlling the operation of the track brakes.

The various novel features of the invention will be apparent from the following description and drawings and will be particularly pointed out in the appended claims.

Referring first to Fig. 1 of the drawings, it will be noted that the invention is illustrated in connection with one section of track brakes 10, 11, 12 and 13. Track brakes 10 and 11 are mounted on opposite sides of one rail 14, and track brakes 12 and 13 are mounted upon opposite sides of the other rail 15. As fully described in our copending application mentioned above, track brakes 10 and 12, in their brake application movements, are yieldably pressed in one direction through spaced transversely arranged members 16, and track brake members 11 and 13 are yieldably pressed in the opposite direction through spaced transversely arranged members 17. Said members 16 and 17 respectively are operatively connected to a primary actuating bar 18, which in turn is actuated in opposite directions through a lever 19 fulcrumed at 100 and pivotally connected at an intermediate point 21 to the bar 18. The other or outer end of the lever 19 is connected to a source of power which in this instance takes the form of an electric motor 20. The electrical motor is geared to and drives a suitably supported screw rod 22 by any suitable gearing, such as pinion or worm and gear, which rod in turn is operatively connected at 26 to the outer end of the associated actuating lever 19. The operative connection between the main actuating bar 18 and the transversely arranged bars 16 and 17 takes the form of reversely inclined blocks 23 and 24, which are secured to or form a part of the bar 18, and which cooperate with grooves 101 formed in the transverse members 16 and 17, or formed by brackets 25 secured to the under side of each of said transverse members 16 and 17. The transversely extending members 16 are bolted or riveted as at 102 to associated angle backing bars 28, and the transversely extending members 17 are riveted or otherwise secured, as at 103, to their associated backing bars 104. Cooperating wedge bars 130 and 131 are located just inwardly of the backing bars 28, and cooperating wedge members 132 and 133 are located just inwardly of the backing bars 104 for a purpose to be described more fully hereinafter. Coil springs 105 are interposed between each wedge member 131 and the brake shoes located at one side of each rail, and coil springs 106 are located between each of the wedge members 133 and the brake shoes located on the other side of each of said rails.

From the arrangement thus far described, it will be appreciated that if the motor 20 actuates the outer end of the lever 19 to the left (as viewed in Fig. 1), the main bar 18 also will be moved to the left for causing the transverse members 16 to move in one direction and the other transverse member 17 to move in the opposite direction for applying the brakes 10, 11, 12 and 13, or, in other words, for moving the brakes 10 and 11 toward each other and the brakes 12 and 13 towards each other for clasping opposite sides of car wheels traversing the track rails. In view of the fact that springs 105 and 106 are provided, the braking pressures are yieldably applied. Rods 107 having heads and nuts and operatively secured to the brake shoes, extend through suitable slots or openings in the associated wedge members 130 and 131, or 132 and 133, as the case may be, and also through the vertical flanges of the backing bars 28 and 104 for the purpose of limiting the separating movement between associated brake shoes and backing bars which are subjected to pressure of springs 105 and 106.

It is important that graduated braking pressures be used because of varying conditions, for example, a greater braking pressure is required for retarding a heavy or loaded car than is required for a light or unloaded car. It is also important to release the brakes quickly for the reasons set forth in our copending application Serial No. 757,105, filed December 20, 1924, as, for example, if for any reason a car wheel should attempt to climb the brake shoes and move vertically away from the associated rails.

In this application we have disclosed an electrical system for controlling the application and release of the brakes whereby the brake shoes normally are given step-by-step graduated positions, and whereby separate step-by-step emergency braking action may be exerted, both the normal and emergency braking actions being conducted in a manner whereby a wide range of braking pressures may be selectively exerted. In this electrical control system we have provided two separate control units, one control unit for controlling the application and release of the brakes under ordinary or normal operating conditions through the actuation of the main actuating bar 18, and the other control unit for controlling the application and release of the brakes under extraordinary or emergency conditions through a relative actuation of the wedge members 130 and 131, and 132 and 133.

A separate motor $20^a$ geared to a suitably supported threaded member 109 is operatively connected to a lever 110, one end of which is secured to a cross shaft 111, to which gears 112 are secured, which gears mesh with and actuate rack bars 113, which form a part of or are secured to the movable wedge members 130 and 132. It will be understood that when the movable wedge members 130 and 132 are actuated in one direction they will coact with the wedge members 131 and 133 respectively for pressing the springs 105 and 106 an increased amount for increasing the braking pressure transmitted to the brake shoes. As indicated above, the wedges are to be used primarily under emergency braking conditions, but it will be appreciated that, if desired, the wedges could be relatively actuated for the primary step-by-step graduated braking action. The movable wedge members are suitably slotted, as at 114, to avoid interference with the location of the rods 107.

Referring more particularly again to the electrical control system for controlling the actuation of the brakes through the actuating bar 18 and through the wedges, a duplicate control is used. In view of this fact but one of the control units will be described in detail.

A master controller 33 is used, having a control handle 34 and associated contact segments 35, 36, 37 and 38. When the control handle 34 is in electrical engagement with segment 35, electrical connections are made for operating the motor 20 for releasing the brakes. When the control handle 34 is in engagement with any of the other associated contacts 36, 37 and 38, electrical connections are made for operating the motor 20 for selectively positioning the brake shoes in definite graduated positions for exerting different definite braking pressures both in brake applying and brake releasing movements. The control mechanism also includes a rod 39 pivotally connected as at 40 to the associated operating lever 19 slightly inwardly from the outer end thereof, said rod being adjustably connected to another rod 41, in turn operatively connected to handles 42 and 43 of circuit controlling members 45 and 46 respectively. The adjustable connection between the rods 39 and 40 includes a bolt 47′ secured to one rod 41, and movable in a slot 48′ in the other. The bolt 47′ in traveling through the slot 48′ is adapted to engage one end of the slot and aso an adjustably mounted band 49′ secured to the slotted bar 39 so that the travel of the bolt 47′ is limited in two directions. The function of the loose connection between the bars 39 and 41 is to take up slack in the brake mechanism during the application and release of the brakes. The controlling member 46 includes brushes 47, 48, 49 and 50, which are secured to an insulated stationary contact holder 51 mounted upon a supporting frame 52. These brushes are adapted to electrically contact with interconnected conducting segments 53 and interconnected conducting segments 54 of a drum 55 mounted to rotate on a pivot pin 56, the arms 43 being secured to the drum 55 at opposite sides thereof and connected to the operating bar 41 through pins 57 carried thereby. The associated circuit controlling member 45 is similarly constructed and has stationary contact brushes 58, 59, 60 and 61 adapted to electrically contact with interconnected conducting segments 62 and interconnected conducting segments 63. The contact brushes 47, 48, 49, 50, 58, 59, 60 and 61 are illustrated diagrammatically in Fig. 10 in connection with the main controller 33.

From the arrangement above described it will be understood that if it is desired to set the brake members 10 and 11, and 12 and 13 in what may be termed their first braking position, wherein, for example, the cooperating brake shoes on either side of the rail are spaced five inches apart to receive therebetween car wheels which are five and one-half inches thick at the point of engagement, the main control lever 34 is moved into engagement with contact 36 when the other circuit controlling members are arranged as shown in Fig. 5. Under such circumstances a circuit is established from main 64 through conductor 65, control handle 34, contact 36, conductor 66, brush 59, contact segment 62 (see Fig. 5), brush 58 (see Fig. 10), conductor 67, solenoid coil 68, conductor 69 and main 70. Completing this circuit energizes the coil 68 for raising the switch 71 and closing the circuits of the motor 20 for applying the track brakes. From the main 70 the motor circuit includes a conductor 72, switch member 73 and conductor 74 terminating in a motor terminal 75. The balance of the circuit extends from main 64 and includes a conductor 76, switch member 77, conductors 78 and 79, the latter of which is connected to the motor terminal 80. A coil winding 81 also is energized and its circuit is completed through a conductor 82 connected to the motor terminal 81ª and main 83 for the purpose of releasing the brakes connected with the motor. In other words, when the coil 81 is deenergized the motor brakes are set for stopping the motor. When the coil 81 is energized, the motor brakes are released. With the motor circuit thus completed through the switch members 73 and 77, the motor 20 operates to move the associated track brake shoes toward each other for gripping car wheels traversing the rails. The brake applying movements of the brakes continue until the electrical connections hereinabove described are changed.

Referring for the moment to Fig. 1 in connection with Figs. 5 to 10 inclusive, it will be appreciated that when the motor 20 first starts its brake applying driving action such action is absorbed in taking up the slack in the brake mechanism represented by the pin and slot connection between the bar members 39 and 41, and as soon as the slack is eliminated the brakes are given brake applying movements. During such brake applying movements the outer ends of the lever 19 are moved to the left, thereby moving the controller bar 41 to the left, which causes a counterclockwise rotative movement of the drums bearing the contact segments. With the control handle 34 on the control segment 36 the contact drums 55 and 55ª will move from the position shown in Fig. 5 to the position shown in Fig. 6, causing the circuit connections to be broken as a result of drum contact segment 62 passing out of engagement with the brush 59, as shown in Fig. 6. As a result thereof, the circuit through the solenoid 68 is broken and accordingly the circuit of the actuating motor 20 is broken at the switch contacts 73 and 77. During the operation thus far described the brakes 10 and 11 and also brakes 12 and 13 have been actuated into their first graduated braking position and stopped in such position as the result of the control hereinabove described. As mentioned above, in this first position of the brake shoes they are five inches apart and due to their spring backing they yieldably receive the car wheels, which are five and one-half inches wide, thereby exerting a yieldable braking pressure commensurate with the position of said brake shoes.

If it is now desired to move said brakes into their second graduated braking position, in which, for example, the brake members or shoes are four and three-quarters inches apart, the control handle 34 may be moved into engagement with the segment 37, whereupon a circuit is established from main 64, through conductor 65, control handle 34, segment 37, conductor 84, brush 49, control segment 53 (see Fig. 6) brush 48 (see Fig. 10), conductor 67, solenoid 68 and conductor 69 to main 70, whereupon switch members 73 and 77 are moved into closed position for completing the circuit of the motor 20. The motor will then give the brakes an additional brake-applying movement until the control circuits again are broken. This will occur when the drums have moved from the position shown in Fig. 6 to the position shown in Fig. 7, wherein the circuit is broken between the drum segment 53 and brush 49, resulting in deenergizing the solenoid 68 and opening of the switches 73 and 77. A yieldable braking action with increased pressure results.

If it is now desired to move the brake shoes into a third graduated position, such for example where the brake shoes are but four and one-half inches apart for giving the normal maximum braking action, the control handle 34 is moved into engagement with segment 38, wherein a circuit is established from main 64 through conductor 65, control handle 34, contact 38, conductor 86, brush 47 (see Fig. 7), drum segment 53, brush 48 (see Fig. 10), conductor 67, solenoid coil 68, conductor 69 to main 70, whereupon the circuit of the motor 20 is closed through switch members 73 and 77. This third graduated brake applying movement will continue until as a result of continual lefthand movement of the lever 19 the circuit is broken between drum segment 53 and brush 47, as shown in Fig. 8, whereupon, through the deenergization of solenoid 68, the circuit of the motor will be broken at the switch members 73 and 77. A yieldable breaking action with increased pressure results.

It is seen, therefore, that the track brakes or retarding members are applied step by step with increasing yieldable pressures as a result of definitely positioning said brakes closer and closer together. The circuit of the actuating motor is completed by movement of one controller for actuating the brakes, and the motor circuit is automatically broken by another controller member which is actuated in response to a predetermined movement of the brakes.

Thus far brake-applying movements in one direction have been considered. Brakes may be released step by step by a reverse action. Let it be assumed that the control parts are as shown in Fig. 8, and the control handle 34 in Fig. 10 is in engagement with contact segments 38 and it is desired to reduce the braking action a given amount wherein the brake shoes, for example, are four and three-quarters inches apart. To do this, control handle 34 is moved in a reverse manner into engagement with contact segment 37 for establishing a circuit from main 64 through conductor 65, handle 34, segment 37, conductor 84, brush 49, drum segment 54 (see Fig. 8), brush 50 (see Fig. 10), conductor 88, solenoid coil 89, conductor 69 to main 70, causing the switch 90 to be actuated to close the motor circuit for giving the motor a reverse rotation. The motor circuit will then be completed from the main 64 through conductor 91, switch member 92 and conductor 74 to the motor terminal 75. The balance of the motor circuit will be from main 70 through switch member 93, conductors 78 and 79 to motor terminal 80. The motor will then be actuated for releasing the brakes a given amount. This releasing movement will continue until the drum segment 54 has been rotated in a clockwise direction out of engagement with the brush 49, as shown in Fig. 7, whereupon the circuit of the solenoid 89 will be interrupted for causing the motor switches 92 and 93 to be opened.

If it is then desired to release the brakes an increased amount or into position, for example, where they are five inches apart, the control handle 34 may be moved into engagement with contact segment 36 for establishing a circuit from main 64 through conductor 65, control handle 34, contact segment 36, conductor 66, brush 59 (see Fig. 7), contact segment 63, brush 60 (see Fig. 10, the upper diagrammatic brush 60), conductor 88, solenoid coil 89 and conductor 69 to main 70. Upon the energization of the solenoid coil 89 the motor switches 92 and 93 are again closed and the motor 20 again actuates the brakes for releasing them a given amount until the drum contact segment 63 is rotated in a clockwise direction out of engagement with the brush 59, as shown in Fig. 6. Such causes the deenergization of the solenoid coil 89 and opens the circuit of the motor at the switch members 92 and 93.

If it is desired to move the brakes into the full release position, the same may be accomplished by moving the control handle 34 into engagement with contact segments 35, whereupon a circuit is established from the main 64 through conductor 65, control handle 34, segment 35, conductor 94, brush 61 (see Fig. 6), drum contact segment 63, brush 60, (see Fig. 10, the lower diagrammatic brush 60), conductor 88, solenoid coil 89, conductor 69 to main 70. The circuit of the motor 20 is then closed again through the switch members 92 and 93 for further releasing the brakes, it being understood during all of the brake releasing movements the outer end of the lever 19 is moved to the right, as viewed in Fig. 1, for rotating segment drums 55 and 55ᵃ in a clockwise direction as viewed in Figs. 5, 6, 7 and 8. This last brake releasing movement will continue until the segment 63 is moved out of engagement with said brush 60, as shown in Fig. 5, whereupon the circuit of solenoid 89 will be interrupted and the motor circuit broken by the switch members 92 and 93.

Thus far specific consideration has been given only to brake applying and brake releasing action transmitted from motor 20 through main actuating bar 18 and transverse members 16 and 17 from which movement to the brakes is transmitted through various other members, including the springs which back the brake shoes. Also specific consideration has been given under what may be termed normal conditions. Preferably the wedges 130 and 131, and 132 and 133 are given a relative actuating movement only under emergency conditions, that is, where a greater braking pressure is desired than is normally transmitted through the main actuating bar 18.

Let it be assumed that the normal maximum braking pressure has been transmitted through the main braking bar 18 and the brakes are in what has heretofore been termed the third position, and let it be assumed further that it is desired to bring into action greater braking pressure. Under such circumstances the motor 20ª is caused to rotate in one direction for driving the wedge members 130 and 132 with respect to their associated wedge members 131 and 133 respectively for compressing the springs 105 and 106 an increased amount for increasing the braking pressure transmitted through the brake shoes to the car wheels. The motor 20ª is controlled through a control system identical with that described in connection with Figs. 5 to 10 inclusive, and may be represented generally by the reference character 33′, it being noted in Fig. 1 that the main controllers 33 and 33′ are illustrated as being associated with their respective motors. It will be understood also that while the motors and associated switches preferably will be located adjacent the track brakes, the master controllers preferably will be located in a tower for remote control. In this way a single tower-man may control many different units distributed throughout the switchyards. The brake shoes have a plurality of emergency step-by-step positions for transmitting graduated braking pressures through said brake shoes, such step-by-step graduated braking pressures being controlled in identically the same way as described in connection with Figs. 5 to 10 inclusive. In connection with the step-by-step control with respect to the wedges, the drums in said control system, corresponding to the drums 55 and 55ª in the other control unit, will be actuated through a bar 41′ operatively connected to the operating lever 110 at point 116.

In view of the fact that the wedge members 130, 131, 132 and 133 are given lateral movements under normal braking operations when the main actuating bar 18 is brought into force, the gears 112 are made wide enough to permit a sliding action of the associated racks 113 thereon.

By means of this double system of brake control the brake shoes may be applied in a step-by-step graduated manner through one control unit for normal operation and may be actuated in a step-by-step graduated manner for giving auxiliary or increased braking action through the second control system, the brakes being applied and released in a manner whereby a wide range of braking pressures are selectively exerted.

It is our intention to cover all modifications of the invention falling within the spirit and scope of the following claims.

We claim:

1. Track brake apparatus for railroads comprising retarding means, main actuating means for said retarding means, and supplementary means for actuating said retarding means.

2. Track brake apparatus for railroads comprising retarding means, means for actuating said retarding means, and additional means for actuating said retarding means.

3. Track brake apparatus for railroads comprising retarding means, means for actuating said retarding means, additional means actuating said retarding means, and means for controlling both of said actuating means.

4. Track brake apparatus for railroads comprising retarding means, means for actuating said retarding means, additional means for actuating said retarding means, means for controlling said first actuating means, and means for controlling said additional actuating means.

5. Track brake apparatus for railroads comprising retarding means coacting with the car wheels, means for normally actuating said retarding means, and means for actuating said retarding means for emergency purposes.

6. Track brake apparatus for railroad cars comprising retarding means coacting with the car wheels, means for actuating said retarding means under normal conditions, and associated means for actuating said retarding means under abnormal operating conditions.

7. Track brake apparatus for railroads comprising brakes coacting with the car wheels, means for normally actuating said brakes, supplemental means for actuating said brakes, and means for controlling the actuation of said brakes.

8. Track brake apparatus for railroad cars comprising brakes coacting with the car wheels, means for actuating said brakes under normal conditions, associated means for actuating said brakes under abnormal conditions, and means for controlling the actuation of said brakes.

9. Track brake apparatus for railroads comprising retarding means coacting with the car wheels, means for normally actuating said retarding means, supplemental means for actuating said retarding means, means for controlling the application of said retarding means under normal operating conditions, and separate control means for controlling the application of said retarding means under abnormal operating conditions.

10. Track brake apparatus for railroads comprising retarding means coacting with the car wheels, means for normally actuating said retarding means, supplemental means for actuating said retarding means, means for controlling the operation of said retarding means under normal operating conditions, and separate control means for controlling the operation of said retarding means under abnormal operating conditions.

11. Track brake apparatus for railroads comprising retarding means coacting with the car wheels, a motor for actuating said retarding means, wedge means interposed between said motor and retarding means through which braking action is transmitted, and control means for controlling said motor whereby said retarding means may exert graduated braking pressures.

12. Track brake apparatus for railroads comprising retarding means, wedge means operable upon said retarding means, and means for transmitting braking pressures to said retarding means through said wedge means from two different sources.

13. Track brake apparatus for railroads comprising retarding means, wedge means operable upon said retarding means, means for transmitting braking pressures to said retarding means through said wedge means from two different sources, one of said sources being supplemental to the other.

14. Track brake apparatus for railroads comprising retarding means, means for transmitting braking pressures to said retarding means from two different sources, and means for controlling the transmission of power from said two different sources.

15. Track brake apparatus for railroads comprising retarding means, means for transmitting braking pressures to said retarding means from two different sources, one of said sources being supplemental to the other, and means for controlling the transmission of power from said two different sources.

16. Track brake apparatus for railroads comprising retarding means coacting with the car wheels, power transmission means including a yieldable member and associated wedge members for transmitting braking pressures to said retarding means, means for giving said wedge members a relative movement for increasing braking pressures, and means for controlling said braking pressures.

17. Track brake apparatus for railroads comprising a brake member adapted to coact with a car wheel, two sources of motive power, and means for transmitting pressures from either of said motive sources to said brake member for braking purposes.

18. Track brake apparatus for railroads comprising a brake member adapted to coact with a car wheel, two sources of motive power, and means for transmitting braking pressures from either or both of said motive sources to said brake member for braking purposes.

19. Track brake apparatus for railroads comprising a brake member adapted to coact with a car wheel, two sources of motive power, means for transmitting pressures from either of said motive sources to said brake member for braking purposes, and means for controlling power transmitted from said motive sources.

20. Track brake apparatus for railroads comprising a brake member adapted to coact with a car wheel, two sources of motive power, means for transmitting braking pressures from either or both of said motive sources to said brake member for braking purposes, and means for controlling the power transmitted from said motive sources.

21. Track brake apparatus for railroads comprising a brake member adapted to coact with car wheels, two sources of motive power, and means for yieldably transmitting braking pressures from either of said motive sources to said brake members for braking purposes.

22. Track brake apparatus for railroads comprising a brake member adapted to coact with car wheels, two sources of motive power, and means for yieldably transmitting braking pressures from either or both of said motive sources to said brake member for braking purposes.

23. Track brake mechanism associated with the tracks of railroads including wheel engaging shoes, means for operating said shoes, means for actuating said means, sources of energy for said last named means, and control means for said sources of energy whereby said shoes may be moved predetermined amounts.

24. Track brake mechanism for railway rolling stock associated with track members including wheel engaging shoes resiliently mounted on actuating means, means for moving said actuating means predetermined amounts, and independent means associated with said shoes for moving said shoes to predetermined wheel engaging positions.

25. In a brake device for railway rolling stock, the combination of rails, a pair of brake shoes disposed on both sides of one of said rails and movable towards said rail for brake setting operation, means for moving said shoes toward said rail, and means for moving said shoes an additional amount toward said rail.

Signed at Chicago, Illinois, this twelfth day of May, 1925.

GEORGE HANNAUER.
EDGAR M. WILCOX.